Figure 4:
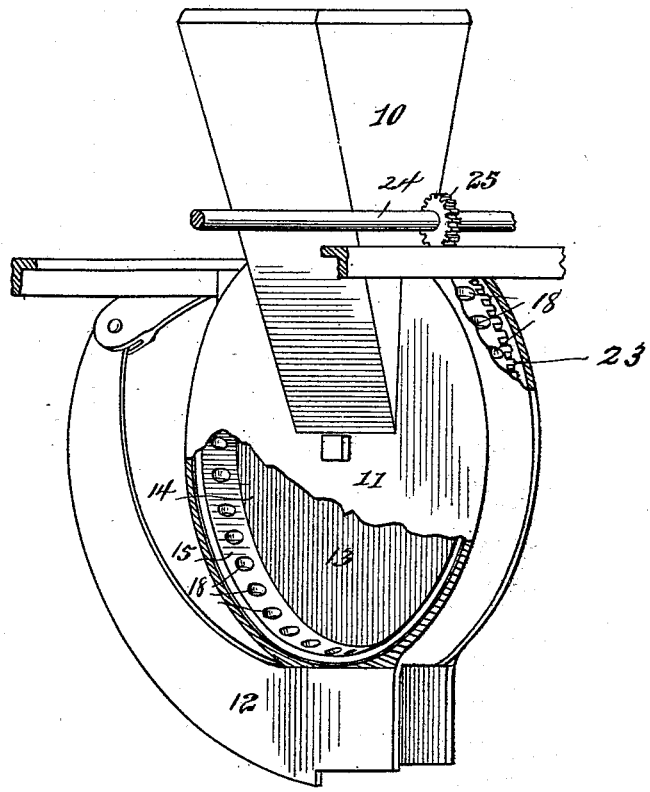

No. 623,093. Patented Apr. 11, 1899.
J. A. MILLER.
CORN PLANTER.
(Application filed Aug. 6, 1898.)
(No Model.) 2 Sheets—Sheet 1.
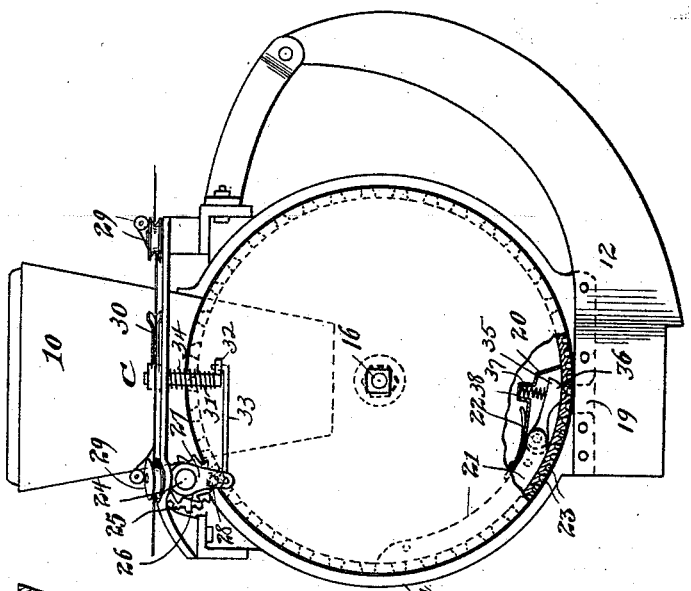
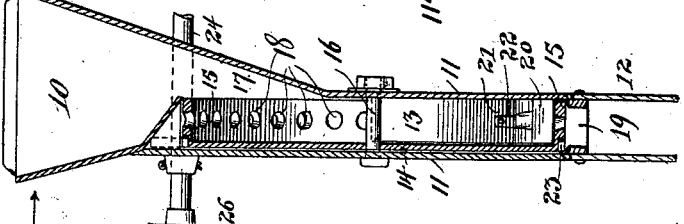
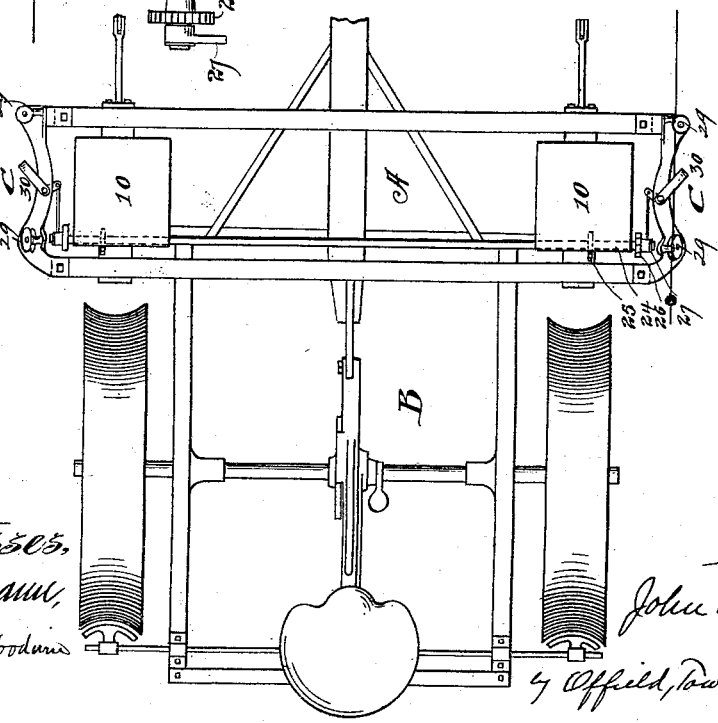
Witnesses,
Inventor,
John A. Miller,
by Offield, Towle & Linthicum
Attys.

No. 623,093. Patented Apr. 11, 1899.
J. A. MILLER.
CORN PLANTER.
(Application filed Aug. 6, 1898.)
(No Model.) 2 Sheets—Sheet 2.

Witnesses,
Inventor,
John A. Miller,

United States Patent Office.

JOHN A. MILLER, OF DAVENPORT, IOWA.

CORN-PLANTER.

SPECIFICATION forming part of Letters Patent No. 623,093, dated April 11, 1899.

Application filed August 6, 1898. Serial No. 687,889. (No model.)

*To all whom it may concern:*

Be it known that I, JOHN A. MILLER, of Davenport, in the county of Scott and State of Iowa, have invented certain new and useful Improvements in Corn-Planters, of which the following is a specification.

This invention relates to corn-planters, and has for its object to provide a simple and efficient seed-dropping mechanism wherein the seed wheel or disk forms a hopper or reservoir for containing the grain and whereby the seed will be deposited at the heel of the runner directly from the seed plate or disk without the employment of valves, boots, or other intermediate parts such as are usually employed in implements of this description.

To these and other ends my invention consists in certain novel features, which I will now proceed to describe and will then particularly point out in the claims.

In the accompanying drawings, Figure 1 is a plan view of a corn-planter embodying my invention. Fig. 2 is a vertical sectional view, on an enlarged scale, through one of the seeding disks or wheels. Fig. 3 is a side elevation of the same mechanism, a portion of the casing being removed; and Fig. 4 is a perspective view of the same mechanism, portions thereof being broken away to show the internal construction.

My present invention relates more particularly to the mechanism for depositing seed in predetermined quantities and to the means for imparting motion to this mechanism. I have, however, shown in Fig. 1 of the drawings a corn-planter embodying my invention, which comprises a front frame A and a rear frame B, hinged thereto, this latter being of any approved construction and needing no detailed description here.

Upon the front frame is mounted the seeding mechanism, to which my invention more particularly relates. To the frame A is secured at each end thereof a hopper 10, below which and communicating with the same laterally is a casing 11, cylindrical in form, extending from the hopper 10 to the runner 12 and inclosing the seed wheel or plate 13. This latter has the form of a hollow cylinder of relatively large diameter and small length, open at one end, and consisting of the disk-shaped web 14 and annular flange or body 15. This wheel is mounted to rotate in a vertical plane upon a horizontal axis 16, supported by the casing 11, and the hopper 10 is provided with a downwardly-extending throat or discharge-passage 17, which is in communication with the open side of the seed-wheel 13. The interior of each seed-wheel thus forms a reservoir for the grain, and owing to the size of the wheels, which extend from the hoppers to the runners, the grain capacity of the machine is thus largely increased.

The rim or body 15 of each wheel is provided with a series of perforations or seed-chambers 18, extending through the same from the interior to the exterior thereof, the grain being prevented from escaping through the apertures thus formed by reason of the inclosing rim 11$^a$ of the casing 11, which latter is provided with a discharge-aperture 19, located in its lower portion at the heel of the runner. The apertures 18 successively register with the aperture 19, and at each such registration a definite quantity of seed, being the amount contained in the seed-chamber 18, is discharged at the heel of the runner.

In order to prevent escape of the grain in quantities larger than the predetermined amount during each registration, I provide a cut-off 20, located within the seed-wheel and bearing upon the inner face of the rim thereof at a point adjacent to the discharge-aperture 19. This cut-off is pivoted to a casting or support 21, secured to the inner face of one of the sides of the casing 11, and is held down upon the rim of the seed-wheel by means of a spring 22.

Intermittent rotary motion is imparted to the seed-wheels by the following mechanism: Each wheel is provided on its periphery with a ring of gear-teeth 23, and a transverse shaft 24 on the frame A is provided with pinions 25, which mesh with these gear-teeth. The shaft 24 is also provided at each of its ends with a ratchet-wheel 26, adjacent to which there is loosely mounted on the shaft a ratchet-arm 27, carrying a spring-pawl 28 to engage the ratchet-wheel. The frame A carries at each end a check-row head C of any approved construction, the form shown comprising guide-wheels 29 and a vibrating forked lever 30, mounted on a vertical shaft 31, having an arm 32 connected with the ratchet-arm 27 by means of a link 33. A spring 34, coiled around the shaft 31 or otherwise suitably arranged, serves to return the lever to its normal position.

In order to hold the seed-wheels stationary while the operating mechanism is not operating to advance them, I employ in connection with each seed-wheel a stop-arm 35, which is pivoted to the casting 21 and is provided with a V-shaped or double-beveled tooth 36 to successively engage the apertures 18 and by such engagement hold the wheel stationary. This engagement is a yielding one, however, the arm being held in position by a spring 37, so as to yield under the power applied to the wheel by its operating mechanism, but to hold the wheel stationary at other times. The stop-arm is covered and inclosed by the cut-off, which is recessed to receive the stop-arm and thus prevent the grain from affecting its operation, and the spring 37 is interposed between the stop-arm and cut-off, which latter has formed in it a seat 38 to receive the spring and hold it in position. Of course the spring 37 is less powerful than the cut-off spring 22 in order to prevent its affecting the operation of this latter in holding the cut-off in operative position. The part 20 thus not only forms a cut-off which by wiping over the inner face of the rim of the wheel acts as a cut-off to determine the amount of grain in each seed-chamber, but also constitutes a casing for the part 36, which latter not only operates as a stop or lock for the wheel, but also as an injector for insuring the discharge of the grain from the seed-wheels.

In operation the hoppers and seed-wheels are filled with grain, thus providing a largely-increased seed capacity for the machine. As the machine advances one of the check-row levers is vibrated at equal intervals by its engagement with and release from the enlargements or knots of the check-row wire and through the link 33, arm 27, pawl 28, and ratchet-wheel 26 imparts an intermittent rotary motion to the shaft 24, which is transmitted to the seed-wheels through the medium of the pinions 25 and gear-teeth 23. The wheels being filled with seed, the chambers or apertures 18 in their rims are filled with the proper quantity of grain, which is conveyed directly to the heels of the runners without the employment of intermediate devices, such as spouts or boots, and is there discharged in predetermined quantities at equal intervals. The cut-offs 20 prevent the passage of any excess of seed at any one discharge, while the stop-arms 35 serve to arrest the motion of the seed-wheels after each discharge and to hold them stationary until the operating mechanism imparts to them the next movement.

I claim—

1. The combination, with the runners and hoppers, of intermediate seed-wheels extending from the former to the latter, having hollow interiors with which the hoppers are in free and constant communication and of which they form part, and seed-chambers extending through their rims, and means for imparting an intermittent rotary motion to said seed-wheels, substantially as described.

2. The combination, with the runners and hoppers, of intermediate seed-wheels extending from the former to the latter, having hollow interiors with which the hoppers are in free and constant communication and of which they form part, and seed-chambers extending through their rims, casings surrounding said seed-wheels, and having discharge-openings in their lower portions at the heels of the runners, and means for imparting an intermediate rotary motion to said seed-wheels, substantially as described.

3. The combination, with the runners and hoppers, of intermediate seed-wheels, having hollow interiors with which the hoppers communicate, seed-chambers extending through their rims, and provided with gear-teeth on their peripheries, a shaft having pinions to mesh with said gear-teeth, ratchet-wheels secured on said shaft, arms provided with pawls loosely mounted on said shaft, and check-row heads having their levers connected with said arms, substantially as described.

4. The combination, with the runners and hoppers, of the seed-wheels intermediate said parts and mounted to revolve on horizontal axes, said seed-wheels having hollow bodies with which the hoppers communicate, and seed-chambers in the form of apertures extending through their rims, check-row mechanism for imparting an intermediate rotary motion to said seed-wheels, and yielding stop-arms adapted to engage the apertures of said wheels and hold the same stationary, substantially as described.

5. The combination, with the hollow seed-wheel and its casing, said seed-wheel being provided with apertures in its rim, of a hollow cut-off pivotally connected with the casing and provided with a spring to hold it in position, and a stop-arm mounted within the cut-off, which serves as a casing for it and having an interposed spring, said arm being adapted to engage the apertures of the rim and serve not only as a stop or lock but also as a seed-ejector substantially as described.

JOHN A. MILLER.

Witnesses:
JNO. BROCKMANN,
JOHN KAUFMANN, Jr.